Patented June 13, 1944

2,351,577

UNITED STATES PATENT OFFICE 2,351,577

ISOMERIZATION OF HYDROCARBONS

Samuel Benson Thomas, Berkeley, Calif., assignor to Shell Development Company, San Francisco, Calif., a corporation of Delaware No Drawing. Application December 8, 1941, Serial No. 422,101

10 Claims. (Cl. 260—683.5)

This invention relates to the catalytic isomerization of hydrocarbons. A principal object of of the invention is to provide an improved process whereby normal or less-branched paraffin hydrocarbons can be converted more efficiently to branched or more highly branched paraffin hydrocarbons.

The process of the invention may be applied with particular advantage to the treatment of normal butane and normal pentane to effect their conversion in a more economical manner to isobutane and isopentane, respectively.

In accordance with the present invention, the hydrocarbon to be isomerized, alone or in admixture with one or more hydrocarbons which may or may not be capable of isomerization under the conditions of execution of the process is contacted at a temperature not exceeding about 300° C. with a solid catalyst essentially comprising an adsorptive material impregnated with an aluminum halide, obtained by heating a partially dehydrated adsorptive material at a temperature above about 140° C. with sufficient aluminum halide to react with at least a substantial part of the bound water in said adsorptive material but insufficient to saturate the adsorptive material, removing the hydrogen halide formed by the reaction at a temperature above about 140° C., thereby causing the decomposition of aluminum halide hydrates, and impregnating the product so formed with a second portion of aluminum halide.

It is well known that the isomerization of saturated hydrocarbons can be catalyzed by the aluminum halides. The aluminum halide is customarily employed per se or in combination with inert carriers. The supported catalysts are usually prepared by simply mixing pieces of carrier material with the powdered anhydrous aluminum halide, whereupon the surface of the carrier becomes coated with the catalyst. Supported aluminum halide catalysts of this type are superior to aluminum halide per se for the isomerization of hydrocarbons because they are less prone to sludge and are more suitable for use in vapor phase operations; in certain cases they are also somewhat more active due to an increased available catalytic surface. In most respects, however, they do not differ materially from aluminum chloride per se and are usually of about the same order of activity.

It has been found that aluminum halide catalysts of materially enhanced ability to catalyze the isomerization of hydrocarbons are obtained by combining the aluminum halide with certain solid inorganic materials containing firmly bound or strongly adsorbed water. This, it has been found, is due primarily to a specific promoting action attributable to materials of this type. The degree of activity, as well as other desirable characteristics of the resulting catalysts is, however, largely dependent upon the conditions under which the aluminum halide and these materials are combined. A certain amount of improvement in catalytic activity may be apparent by simply mechanically mixing the aluminum halide and one of a select few of these materials most effective in their promoting ability. It is found, however, that the promotion action of carrier materials of this type is considerably more pronounced, and superior catalysts result, if the aluminum halide is combined with them by suitable thermal methods. The present practice in producing such catalysts is to mix an amount of aluminum halide not substantially in excess of that required to completely saturate the carrier with a suitable adsorptive carrier containing firmly bound water and heat the mixture in a closed vessel until the total aluminum halide is adsorbed in the carrier. The charge is then cooled, any pressure released, and the granular catalyst is removed, ready for use. Catalysts prepared in this manner are more effective in promoting the isomerization of hydrocarbons than the various conventional aluminum halide catalysts. I have found, however, that the decline in activity of catalysts prepared in this manner is due, at least to a substantial degree, to the presence in the catalyst of aluminum halide hydrates which decompose to form alumina and hydrogen halide during the use of the catalyst. I have, furthermore, found that these catalysts can be prepared in a manner whereby the formation of aluminum halide hydrates is prevented or decomposed during the preparation of the catalyst, and that portion of the bound water content of the adsorptive carrier, capable of subsequent reaction with aluminum halide, is removed without thereby impairing the ability of the adsorbents to promote the catalyzing effect of the aluminum halide upon the hydrocarbon isomerization reaction.

In my copending application, Serial No. 389,772, filed April 22, 1941, of which this application is a continuation-in-part, I have described a novel method whereby these superior aluminum halide catalysts, containing no substantial quantity of aluminum halide hydrates, and from which that portion of bound water capable of reacting with aluminum halide has been removed, can be economically and efficiently prepared. In accordance with this method, a suitable inorganic carrier material containing bound water is heated at a temperature above about 140° C. with an amount of aluminum halide sufficient to react with at least a substantial amount of the bound water present in the carrier material, but insufficient to saturate the carrier material. Hydrogen halide formed by the reaction of the aluminum halide with water in the carrier is removed during the heating operation, thereby causing the decomposition of aluminum halide hydrates, and the product so formed is impregnated with an additional quantity of aluminum halide to produce a catalyst having the desired concentration of aluminum halide.

Suitable solid inorganic materials containing bound water which may be combined with the aluminum halide comprise those solid inorganic materials containing bound water which can be partially dehydrated by heating at moderately elevated or high temperatures, for instance above about 200° C. Preferred carrier materials of this class are those containing relatively firmly bound water, water of hydration, or water of crystallization. Such suitable materials comprise the aluminous and/or silicious adsorptive materials of natural or synthetic origin which contain a small amount of firmly bound or strongly adsorbed water such as, for example, the naturally occurring minerals and clays, such as pipe clay, fuller's earth, bentonite, kaolin, Florida earth, meerschaum, infusorial earth, kieselguhr, diatomaceous earth, montmorillonite, the zeolites, and the like; the various treated clays and clay-like materials; and artificially prepared materials such as activated alumina, artificial permutites, and the like. These materials described above are preferably, but not necessarily, partially dehydrated and/or activated by heating in a drying atmosphere at a temperature higher than that at which they are combined with the aluminum halide until they substantially cease to give off water. Thus, it is usually preferred to first partially dehydrate many carrier materials to such an extent that they are not substantially further dehydrated by heating at temperatures below 250° C. to 300° C., but still contain an appreciable amount, for instance 2% to 10%, of water which may be removed by more drastic heating conditions. It is specifically pointed out that the material is not to be completely dehydrated in this step. Attempts to prepare anhydrous aluminum halide catalysts by completely dehydrating the inorganic material at high temperatures before combining them with the aluminum halide led to the formation of inferior catalysts.

Of the above-specified inorganic carrier materials containing bound water, I prefer to employ those having an appreciable adsorptive ability. Such materials are capable of adsorbing greater quantities of aluminum halide and thus produce catalysts of greater activity and longer life, and which have lower vapor pressures at elevated temperatures. Adsorptive aluminas, especially adsorptive aluminas containing substantial amounts of alumina alpha monohydrate, are particularly effective.

Although it is in no wise intended to limit the invention by the soundness or accuracy of any theories advanced herein to explain the advantageous results obtained when utilizing the solid inorganic materials of this type, it is believed that the water originally inherent in these materials functions in some manner to activate the final product. This may be due to the presence in the material of the water itself, but more likely is due to surface conditions resulting in part from the reaction of firmly-bound water with the anhydrous aluminum halide at the conditions under which the catalyst combinations are prepared. If desired, any of the common inert catalyst carriers such, for instance, as crushed coke, crushed brick, pumice, porcelain chips, majolica chips, chamotte, activated charcoal, asbestos, and the like may be used in conjunction with one or more of the above-mentioned more active materials.

Of the available aluminum halides which may be combined with the carrier materials of the type described above, aluminum chloride is preferred. Though aluminum bromide produces catalysts which are usually even more active than those prepared from aluminum chloride, it is considerably more expensive. It may often be economically employed, nevertheless, for certain purposes. Particularly active catalysts may be prepared, for example, with a mixture of aluminum halides, such as a mixture of aluminum chloride and aluminum bromide.

In order to prepare catalysts having the optimum activity, the aluminum halide and promoting carrier are combined in certain preferred proportions. When the aluminum halide content of the catalyst is too great, not only is the promoting effect of the specified carriers masked, but the catalyst exhibits higher vapor pressures.

The optimum amount of aluminum halide to be combined with the active carrier depends to some extent upon the particular aluminum halide employed, and upon certain characteristics of the particular solid inorganic material with which it is combined. Thus, the amount of aluminum chloride to be combined with a particular carrier material to realize the maximum promoting effect depends upon the available surface area of the material. In general, an amount of aluminum chloride yielding a catalyst having an aluminum chloride content of from about 8% to about 28% will be found sufficient. A material which has a large inner surface may require an aluminum chloride content of as much as about 28%, whereas certain adsorptive clays may require as little as about 8%. The majority of active solid inorganic materials, however, generally give optimum results when the aluminum chloride content is between these extremes. Thus, the best catalysts prepared by combining aluminum chloride and activated alumina, for example, contain between about 15% and about 28%, and preferably between 17% and 23% of aluminum chloride. When aluminum bromide is employed, these concentrations are generally slightly lower.

The amount of aluminum halide added to the carrier material in the first step of the catalyst preparation depends to a certain degree upon the particular inorganic material used and the water content thereof. It may sometimes equal the stoichiometrical equivalent of the water in the carrier material, but should preferably be less than sufficient to completely saturate the carrier. In the preparation of catalyst combinations with a partially dehydrated activated alumina containing, for example, about 5 per cent of water, an initial amount of aluminum halide equal to about 15 to 20 per cent by weight of the alumina charge is quite suitable. The resulting mixture is heated at a temperature sufficiently high to cause the reaction of the aluminum halide with the bound water in the carrier; for example, a temperature in excess of 140° C. Temperatures substantially above about 350° C., although applicable, are not usually necessary. A suitable temperature range which may be advantageously employed with most of the carrier materials of the above-described type is, for example, between about 150° C. and about 250° C. The reaction of the aluminum halide with the bound water in the carrier during this phase of the process is accompanied by the evolution of the corresponding hydrogen halide. The formation of appreciable quantities of hydrates is avoided by removing liberated hydrogen halide from the reaction zone. The removal of liberated hydrogen halide is effected while the catalyst mixture is at a temperature of at least about 140° C. At lower temperatures, the aluminum halide hydrates decompose only very slowly. Consequently, if the reaction mixture is cooled to substantially below 140° C. before liberated hydrogen halide is removed, the substantial quantities of aluminum halide hydrates formed remain in the catalyst. A preferred method of operation is to heat the mixture of aluminum halide and carrier material in a closed container and then maintain a suitable moderately elevated pressure by the intermittent or continuous release of the liberated hydrogen halide. A criterion of a suitable pressure range is the steady evolution of the gaseous reaction products comprising hydrogen halide, indicative of the formation of the desired product. Thus, in the production of a catalyst combination comprising anhydrous aluminum chloride and alumina excellent results are achieved by the maintenance of pressures in the approximate range of 25 to 100 lbs. gauge. When employing aluminum chloride, pressures of at least 2½ atmospheres absolute, for instance 40 to 75 lbs./sq. in. are somewhat preferred.

Without intention of limiting the invention in any wise by the soundness or accuracy of any theory advanced herein to explain the improved results obtained by the process of the invention, it is believed that, under the conditions at which the solid inorganic material is combined with the aluminum halide, the aluminum halide reacts with at least a part of the firmly-bound water of the solid inorganic material to form aluminum halide hydrates. At atmospheric pressure these compounds normally tend to decompose in the temperature range of from 125° C. to 200° C., but in the presence of a sufficiently high hydrogen halide pressure, such as that produced when heating and cooling the mixture in a closed reaction vessel, the aluminum halide hydrates are stable at temperatures even as high as about 225° C. Thus, it has been noticed that the products obtained by heating and then cooling mixtures of anhydrous aluminum chloride and alumina carriers, which have been partially dehydrated at a temperature above about 375° C., in a closed bomb, contain appreciable amounts of water in the form of aluminum chloride hydrates. By liberating the hydrogen halide above about 140° C., the aluminum halide hydrates are decomposed with the formation of alumina and the corresponding hydrogen halide. The formation of this alumina may well contribute to the high activity of the resulting anhydrous reaction product. The maintenance of the moderately elevated pressure, on the other hand, minimizes any loss of aluminum halide with the gaseous reaction products by favoring the adsorption of aluminum halide by the carrier and also minimizes the small loss of aluminum halide which might be incurred when venting the hydrogen halide. The entirely different nature of the product obtained by combining the aluminum halide and the solid inorganic material in this novel manner, and that obtained by heating and cooling these materials in identical proportions in closed vessels, is apparent on observing their behavior under the application of heat. Upon heating the latter product, hydrogen halide and water are first liberated. The immediate liberation of hydrogen halide and water upon heating is apparently the result of the decomposition of aluminum halide hydrates. Such behavior of a catalyst in use reduces the aluminum halide content and results in a more rapid rate of catalyst decline. Upon heating the catalysts used in the process of the invention, a small amount of hydrogen halide is first liberated, then aluminum halide vapors, and water is not evolved until evolution of aluminum halide vapors has substantially ceased.

The initial heating of the aluminum chloride and activated alumina is continued until the tendency to generate further pressure as a result of the formation of gaseous reaction products has ceased or has been reduced to a negligible extent. The resulting substantially anhydrous catalytic reaction product is then cooled. Additional anhydrous aluminum halide is added in an amount sufficient not only to replace the aluminum halide consumed by reaction, but to raise the aluminum halide content of the final catalyst combination to the desired amount. The mixture is thereupon heated at a temperature which may equal, but which is preferably below, the maximum temperature of the initial heating. Thus, the second heating step may suitably be carried out at a temperature in the approximate range of from 200° C. to 250° C. Since the materials treated in the second phase of the process are substantially free of bound water capable of reaction with the aluminum chloride at these conditions, this step may be carried out in a closed vessel without tendency to generate pressures substantially above those exerted by the aluminum halide vapors. The second heating is continued to effect the adsorption of the added aluminum halide into the substantially anhydrous reaction product obtained from the first phase of the process.

Upon cooling the products, after each of the two heating steps of the process, the pressure is preferably reduced to atmospheric pressure at a temperature above about 140° C., for example at the temperature of approximately 150° C., before further substantial cooling.

The advantages realized by the use of these improved catalysts for the isomerization of hydrocarbons are several and important. The use of the improved catalyst not only enables the isomerization of hydrocarbons to be carried out with increased yields, but their unusually slow rate of decline in activity makes possible their use over considerably prolonged periods of continuous operation at a high level of catalytic activity. The increase in the total amount of branched-chain hydrocarbons produced per pound of catalyst, the saving in catalyst materials due to less frequent need for regenerating the catalyst, and the reduction in operating cost resulting from increased periods of continuous operation at relatively high levels of catalyst activity make possible the isomerization of hydrocarbons with substantially increased efficiency and economy.

The process of the invention may be applied to the isomerization of pure or substantially pure butane and normal pentane. The hydrocarbons treated need, however, not necessarily be pure or substantially pure individual hydrocarbons, but may comprise other hydrocarbons which may or may not be isomerizable under the conditions of execution of the process. Thus, hydrocarbon mixtures comprising substantial amounts of normal butane or normal pentane may be treated to convert at least a substantial part of the normal butane or normal pentane content to isobutane and isopentane respectively. Suitable starting materials comprise hydrocarbon fractions containing substantial amounts of normal butane and normal pentane obtainable, for example, from natural gas, the products of thermal or catalytic hydrocarbon conversions, etc. Especially suitable mixtures of hydrocarbons are the so-called butane-butylene fraction and pentane-amylene fraction from which unsaturated hydrocarbons have been removed. Treatment of mixtures such as obtained, for instance, as a by-product from the sulfuric acid alkylation of isoparaffins results in materially increasing their content of branched isomers and converting them to suitable raw materials for re-use in the alkylation process.

Although the process of the invention may be applied with particular advantage to the isomerization of normal butane and/or normal pentane, the invention does not preclude the treatment of higher hydrocarbons such as, for example, paraffinic hydrocarbons having from five to ten carbon atoms to the molecule, as well as isomerizable naphthenic hydrocarbons such as methyl cyclopentane, dimethyl cyclopentane, etc. Since hydrocarbons having more than four carbon atoms to the molecule are particularly prone to undergo decomposition at relatively low temperatures in the presence of aluminum halide catalysts, a material capable of suppressing hydrocarbon decomposition such as, for example, hydrogen, is preferably added to the charge when treating these higher hydrocarbons. The presence of substantial amounts of olefins and/or aromatic hydrocarbons in the feed are detrimental to the isomerization processes. The hydrocarbon or hydrocarbon mixtures to be treated are therefore preferably pretreated, for example, with a mineral acid or with a portion of spent catalyst obtained in the process, to remove at least a substantial amount of these and other impurities therefrom.

The process of the invention is preferably executed in the presence of a hydrogen halide promoter. In general, concentrations of hydrogen halide such as, for example, hydrogen chloride, in the amount of about 2% to about 10% by weight of the hydrocarbon charge, are sufficient. Higher or lower concentrations may, however, be used. The hydrogen halide promoter may be added to the hydrocarbon feed to the process, or at least a part of the hydrogen halide may be separately introduced, either continuously or intermittently, into the reaction zone.

The temperature at which the process is executed will vary within the broad temperature range of from about 30° C. to about 300° C., depending upon the particular hydrocarbon treated and the composition of the catalyst employed. When isomerizing normal butane in the vapor phase, a temperature in the range of, for example, from about 80° C. to about 150° C. is generally preferred. When isomerizing normal pentane in the vapor phase in the absence of a hydrocarbon decomposition suppressor, temperatures in the range of, for example, from about 30° C. to about 80° C. are somewhat preferred. However, when isomerizing normal pentane in the presence of a suitable hydrocarbon decomposition suppressor, excellent results are obtained at even higher temperatures, up to, for example, about 100° C. The process may be executed at subatmospheric, atmospheric, or superatmospheric pressure. Pressures somewhat in excess of atmospheric pressure, up to, for example, about 300 pounds, are, however, generally preferred. It is to be understood, however, that higher pressures, if desired, may be used.

Any suitable apparatus comprising a reaction zone enabling suitable contact of the hydrocarbon being treated with the catalyst may be used. The reaction zone may comprise, for example, one or more elongated reaction chambers, or a plurality of reaction tubes containing the catalyst, arranged in parallel or in series, and provided with means for maintaining the desired temperature conditions therein. The process may be executed in a batch, intermittent, or continuous manner. It is particularly well adapted to a continuous mode of operation. The branched-chain hydrocarbon produced in the process may be separated from the unconverted charge and hydrogen halide promoter by any suitable method which may comprise such steps as fractional distillation, selective absorption, selective reaction such as selective dehydrogenation, alkylation with olefins, etc. A part or all of the hydrogen halide promoter and unconverted charge separated from the isomerization reaction product may be recycled to the reaction zone.

The substantially improved results obtainable in the isomerization of saturated hydrocarbons in accordance with the process of the invention are illustrated by the following examples. It is not intended to limit the invention by any particular catalyst, particular operating conditions, or particular hydrocarbon treated, in the examples.

*Example I*

A catalyst "A" was prepared by reacting 280 parts by weight of adsorptive alumina partially dehydrated at a temperature of 400° C. to a water content of 5.1% and 120 parts by weight of anhydrous aluminum chloride in a sealed rotating vessel. The vessel was heated to 220° C. in 270 minutes and cooled to 165° C. in 145 minutes. The maximum pressure developed in the vessel was 245 pounds gauge. The vessel was cooled to room temperature before the pressure was reduced to atmospheric. The resulting catalyst contained 23 per cent by weight of $AlCl_3$.

A second catalyst "B" was prepared by heating 79.7 parts by weight of adsorptive alumina, partially dehydrated at a temperature of approximately 400° C. to a water content of 6.5%, and 13.4 parts by weight of aluminum chloride in a rotating vessel for 8 hours at a temperature above 150° C. (maximum temperature 260° C.). Hydrogen chloride was vented from the vessel during the heating to avoid pressures exceeding 65 pounds gauge. Upon cooling the vessel, care was taken to vent to atmospheric pressure at 150° C. Anhydrous aluminum chloride in the amount of 13.4 parts by weight was then added to the cooled material and the vessel reheated for 4½ hours above 150° C. (maximum temperature 226° C.)

without venting. The maximum pressure developed was 64 pounds gauge. The vessel was cooled and vented to atmospheric pressure at 150° C. The resulting catalyst contained 22.3 per cent AlCl₃ by weight.

Butane vapors were passed over catalysts A and B at a temperature of 100° C. and a pressure of 11 atmospheres, at a space velocity of 11 mols of butane per liter of catalyst per hour. Hydrogen chloride was added in the amount of 3 mol per cent of the feed. After 225 hours of operation, a conversion of 21 mol per cent was obtained with catalyst A; whereas with catalyst B, a conversion of 31 mol per cent was still being obtained. The average conversion for the 225 hour period was 36% for catalyst A and 43% for catalyst B.

Thereupon, the isomerization in the presence of catalyst B was continued for an additional 250 hours before the conversion declined to 22.5 mol per cent. The average conversion of normal butane to isobutane obtained with catalyst B for the 475-hour period was 40 mol per cent.

*Example II*

Activated bauxite, partially dehydrated at a temperature of about 400° C. to a water content of 6.5 per cent was mixed with 15.45 per cent by weight (based on total charge) of anhydrous AlCl₃ and heated in a rotating vessel for about seven hours at a temperature of 250° C. Gaseous reaction products were vented to maintain the pressure below 60 pounds gauge. The vessel and contents were cooled, the pressure being reduced to atmospheric pressure at 150° C. Additional anhydrous AlCl₃ in an amount equal to 12.35 per cent by weight of the total charge was added. The resulting mixture was reheated for four hours at a temperature above 150° C. (maximum temperature 215° C.) without venting. The maximum pressure attained during the second heating was 60 pounds gauge. The vessel and contents were then cooled. The pressure was reduced to atmospheric pressure at 150° C. The resulting catalyst combination contained 19 per cent by weight of AlCl₃.

A mixture consisting of 97 mol per cent butane and 3 mol per cent hydrogen chloride was passed continuously over a portion of the catalyst at the rate of 11.7 mols of charge per liter of catalyst per hour at a temperature of 100° C. and a pressure of 150 lbs. per sq. in. The isobutane content of the product initially obtained amounted to 62 mol per cent. The operation was continued for a period of 208 hours during which period an average conversion to isobutane of 41.2 per cent was obtained.

The same catalyst was then used without prior activation to treat a mixture consisting of 85 mol per cent of butane and 15 mol per cent of hydrogen chloride for an additional period of 74 hours at 100° C. and 150 lbs. per sq. in., and at a feed rate of 9.9 mols per liter of catalyst per hour. Under these operating conditions, an average conversion to isobutane of 42.4 per cent was obtained for the 74 hour period. After 282 hours of continuous operation with the same catalyst a conversion of normal butane to isobutane of 32 per cent was still being obtained.

*Example III*

Adsorptive alumina, partially dehydrated at a temperature of about 400° C. to a water content of 6.5 per cent, was mixed with 19.0% by weight (based on total charge) of anhydrous aluminum chloride and heated in a rotating vessel for 230 minutes at a temperature above 150° C. (maximum temperature 350° C.). Hydrogen chloride was vented from the vessel during the heating operation to maintain a pressure below 65 pounds gauge. The vessel and contents were cooled, care being taken to vent to atmospheric pressure at a temperature above 140° C. A second portion of anhydrous aluminum chloride in an amount of 19% by weight of the total charge was added to the mixture and the vessel reheated without venting at a temperature above 150° C. (maximum temperature 226° C.) for about 3 hours. The maximum pressure attained during the second heating was 85 pounds gauge. The vessel and contents were cooled, care being taken to vent to atmospheric pressure above 140° C. The resulting catalyst contained 20 per cent by weight of aluminum chloride.

Butane vapors were passed over a portion of the catalyst at a temperature of 100° C. at a pressure of 11 atmospheres, and at a space velocity of from 10 to 12 mols of butane per liter of catalyst per hour. Hydrogen chloride was added to the feed in an amount of from 3% to 15% of the charge. An average conversion of butane to isobutane of 40 mol per cent was obtained for a period of 465 hours of continuous operation.

*Example IV*

A catalyst comprising activated alumina in combination with 20.5% by weight of aluminum chloride was prepared as described in Example II, with the exception that the second addition of aluminum chloride amounted to 22.5% by weight of the total charge and the time during which the mixture was maintained above 150° C. in the second heating step was reduced to 85 minutes.

Butane vapors were passed over a portion of the catalyst at a temperature of 100° C., under a pressure of 11 atmospheres, and at a space velocity of 10 to 11 mols of butane per liter of catalyst per hour. Hydrogen chloride in the amount of from 3 to 15 mol per cent was added to the butane feed. An average conversion of butane to isobutane of 41 mol per cent was obtained for a period of 600 hours of continuous operation.

I claim as my invention:

1. A process for the conversion of normal butane to isobutane which comprises contacting normal butane at a temperature not greater than about 200° C. with a solid catalyst essentially comprising adsorptive alumina impregnated with aluminum chloride substantially free from aluminum chloride hydrates obtained by heating a partially dehydrated adsorptive alumina at a temperature above about 140° C. in a closed vessel with sufficient aluminum chloride to react with at least a substantial part of the bound water in the alumina but insufficient to saturate the alumina, removing hydrogen chloride formed by the reaction at a temperature above 140° C., and impregnating the product so formed with a second portion of aluminum chloride in an amount sufficient to substantially saturate said alumina.

2. A process for the conversion of normal butane to isobutane which comprises contacting normal butane at a temperature not greater than 200 C. with a solid catalyst essentially comprising an adsorptive inorganic carrier material impregnated with an aluminum halide substantially free from aluminum halide hydrates obtained by heating an adsorptive inorganic carrier material containing bound water at a temperature above 140° C. in a closed vessel with sufficient aluminum halide to react with at least a substantial part of the bound water in the adsorptive material but insufficient to saturate the adsorptive material, removing hydrogen halide formed by the reaction at a temperature above 140° C., and impregnating the product so formed with a second portion of the aluminum halide in an amount sufficient to substantially saturate the adsorbent material.

3. A process for the conversion of normal pentane to isopentane which comprises contacting normal pentane at a temperature not greater than 100° C. with a solid catalyst essentially comprising adsorptive alumina impregnated with aluminum chloride substantially free from aluminum chloride hydrates obtained by heating a partially dehydrated adsorptive alumina at a temperature above about 140° C. in a closed vessel with sufficient aluminum chloride to react with at least a substantial part of the bound water in the alumina but insufficient to saturate the alumina, removing hydrogen chloride formed by the reaction at a temperature above 140° C., and impregnating the product so formed with a second portion of aluminum chloride in an amount sufficient to substantially saturate said alumina.

4. A process for the conversion of a normal paraffin hydrocarbon to a branched-chain paraffin hydrocarbon which comprises contacting the normal paraffin hydrocarbon at a temperature not greater than 300° C. with a solid catalyst essentially comprising adsorptive alumina impregnated with aluminum chloride and substantially free of aluminum chloride hydrates obtained by heating a partially dehydrated adsorptive alumina at a temperature above about 140° C. in a closed vessel with sufficient aluminum chloride to react with at least a substantial part of the bound water in the alumina but insufficient to saturate the alumina, removing hydrogen chloride formed by the reaction at a temperature above about 140° C., and impregnating the product so formed with a second portion of aluminum chloride in an amount sufficient to substantially saturate said alumina.

5. A process for the conversion of normal and branched-chain paraffin hydrocarbons to branched and more highly branched-chain paraffin hydrocarbons which comprises contacting the hydrocarbons to be treated at a temperature not greater than 300° C. with a solid catalyst essentially comprising adsorptive alumina impregnated with an aluminum halide substantially free of aluminum halide hydrates obtained by heating a partially dehydrated adsorptive alumina at a temperature above about 140° C. in a closed vessel with sufficient aluminum halide to react with at least a substantial part of the bound water in the alumina, but insufficient to saturate the alumina, removing hydrogen halide formed by the reaction at a temperature above about 140° C., and impregnating the product so formed with a second portion of the aluminum halide in an amount sufficient to substantially saturate said alumina.

6. A process for the conversion of normal and branched-chain paraffin hydrocarbons to branched and more highly branched paraffin hydrocarbons which comprises contacting the hydrocarbons to be treated at a temperature not greater than 300° C. with a solid catalyst essentially comprising an adsorptive inorganic carrier material impregnated with an aluminum halide and substantially free of aluminum halide hydrates obtained by heating an adsorptive inorganic carrier material containing bound water at a temperature above about 140° C. in a closed vessel with sufficient aluminum halide to react with at least a substantial part of the bound water in the adsorptive material but insufficient to saturate the adsorptive material, removing hydrogen halide formed by the reaction at a temperature above 140° C., and impregnating the product so formed with a second portion of the aluminum halide in an amount sufficient to substantially saturate said carrier material.

7. A process for the conversion of normal and branched-chain saturated hydrocarbons to branched and more highly branched-chain saturated hydrocarbons which comprises contacting the hydrocarbons to be treated at a temperature not greater than 300° C. with a solid catalyst essentially comprising adsorptive alumina impregnated with aluminum chloride and substantially free of aluminum chloride hydrates obtained by heating a partially dehydrated adsorptive alumina at a temperature above about 140° C. in a closed vessel with sufficient aluminum chloride to react with at least a substantial part of the bound water in the alumina but insufficient to saturate the alumina, removing hydrogen chloride formed by the reaction at a temperature above about 140° C., and impregnating the product so formed with a second portion of aluminum chloride in an amount sufficient to substantially saturate said alumina.

8. A process for the conversion of normal and branched-chain saturated hydrocarbons to branched and more highly-branched saturated hydrocarbons which comprises contacting the hydrocarbons to be treated at a temperature not greater than 300° C. with a solid catalyst essentially comprising an adsorptive inorganic carrier material impregnated with an aluminum halide and substantially free of aluminum halide hydrates obtained by heating an adsorptive inorganic carrier material containing bound water at a temperature above about 140° C. in a closed vassel with sufficient aluminum halide to react with at least a substantial part of the bound water in the adsorptive material but insufficient to saturate the adsorptive material, removing hydrogen halide formed by the reaction at a temperature above 140° C., and impregnating the product so formed with a second portion of the aluminum halide in an amount sufficient to substantially saturate said carrier material.

9. A process for the conversion of normal and branched-chain saturated hydrocarbons to branched and more highly-branched saturated hydrocarbons which comprises contacting the hydrocarbons to be treated in the presence of a promoting amount of a hydrogen halide at a temperature not greater than 300° C. with a solid catalyst essentially comprising an adsorptive inorganic carrier material impregnated with an aluminum halide and substantially free of aluminum halide hydrates obtained by heating an adsorptive inorganic carrier material containing bound water at a temperature above about 140° C. in a closed vessel with sufficient aluminum halide to react with at least a substantial part of the bound water in the adsorptive material but insufficient to saturate the adsorptive material, removing hydrogen halide formed by the reaction at a temperature above 140° C., and impregnating the product so formed with a second portion of the aluminum halide in an amount sufficient to substantially saturate said carrier material.

10. A process for the isomerization of saturated hydrocarbons which comprises contacting an isomerizable saturated hydrocarbon with a solid catalyst essentially comprising an adsorptive inorganic carrier material impregnated with an aluminum halide and substantially free of aluminum halide hydrates obtained by heating an adsorptive inorganic carrier material containing bound water at a temperature above about 140° C. in a closed vessel with sufficient aluminum halide to react with at least a substantial part of the bound water in the adsorptive material but insufficient to saturate the adsorptive material, removing hydrogen halide formed by the reaction at a temperature above about 140° C. and impregnating the product so formed with a second portion of the aluminum halide.

SAMUEL BENSON THOMAS.